Figure 1:
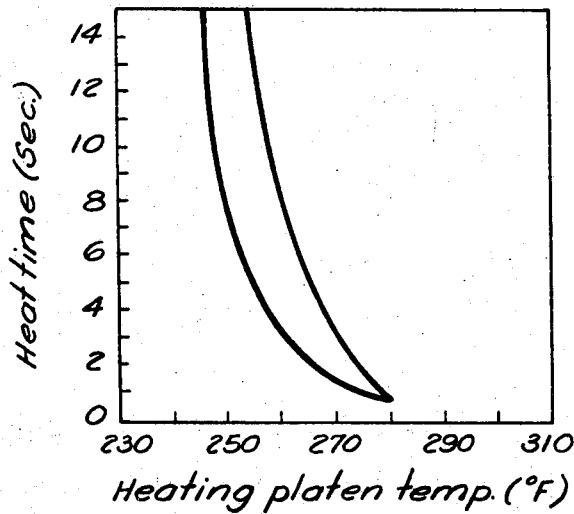

INVENTORS.
Earl F. Engles
William R. R. Park
Donald A. Shmidt

United States Patent Office 3,374,301
Patented Mar. 19, 1968

3,374,301
METHOD OF THERMOFORMING ALKENYL AROMATIC RESINOUS SHEET
Earl F. Engles, William R. R. Park and Donald A. Shmidt, Midland, Mich., assignors to The Dow Chemical Company, Midland, Mich., a corporation of Delaware
Continuation-in-part of application Ser. No. 204,123, June 21, 1962. This application June 1, 1965, Ser. No. 460,335
6 Claims. (Cl. 264—134)

This application is a continuation-in-part of U.S. Ser. No. 204,123, filed June 21, 1962, now abandoned.

This invention relates to the thermoforming of plastic sheets. It more particularly relates to an improved method utilizing a coated alkenyl aromatic resinous sheet having a surface coating which improves the thermoforming characteristics thereof.

The invention is particularly adapted to be practiced with integral solid thermoplastic styrene polymer film or sheets. Such a polymyer is employed herein as being generally representative of alkenyl aromatic compounds of the type that contain at least about 50 weight percent of at least one polymerized alkenyl aromatic compound or monomer having the general formula: Ar—CR=CH$_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of α-methyl styrene, ar-methyl styrene (or vinyl toluene), the several mono- and di-chlorostyrenes and ar-dimethyl styrenes, including copolymers thereof with such materials as acrylonitrile; and graft copolymers with other polymeric substances (such as other elastomeric polymers) may frequently be utilized with benefits commensurate or in excess of those which are derivable from employmene of polystyrene alone.

The term "thermoforming" as applied herein refers to processes of forming alkenyl aromatic resinous sheets by heating the sheet and subsequently forming the sheet while still in a heated condition, subsequently cooling the sheet to provide a relatively rigid formed object. Typical thermoforming processes are vacuum forming, drape forming, pressure forming, and the like. Such processes have in common the step of heating a sheet, usually a flat sheet, but sometimes a sheet which has been previously thermoformed, to a temperature where it is readily deformable without rupture, forcing it to conform to some mold, pattern, or similar shaping means. Certain alkenyl aromatic resinous sheets are relatively difficult to thermoform and require rather exacting temperature control. Such exacting temperature control, in commercial practice, is undesirable as it requires expensive instrumentation and time consuming setup time. For example, if a sheet of polystyrene is to be thermoformed into an article such as a meat tray, suitable operating conditions must be determined. The thermoforming apparatus is provided with a heat source, usually a frame to hold the sheet material to be formed and a mold. Sheet temperature, the temperature gradient within the sheet, all appear to be critical factors in proper forming. Many alkenyl aromatic resinous sheets exhibit a very narrow operating range in the forming operation. Typically, FIGURE 1 graphically illustrates what may be termed an operating area for an oriented alkenyl aromatic sheet. A sheet to be formed is heated on a platen in a themoforming apparatus for a given period of time, and then formed by blow molding. The abscissa represents platen temperature in degrees Fahrenheit, and the ordinate shows the heating time in seconds. Thus, the longer the heating time employed, the lower the platen temperature need be. For an example, at a heating time of 8 seconds acceptable parts are obtained if the platen temperature is between about 250–260° Fahrenheit, whereas if a heating time of 15 seconds is utilized, the platen temperature may then vary between 245–254° Fahrenheit. If shorter heating time is desirable, such as 1 second, the platen temperature must be between 270–278° Fahrenheit.

In most commercial operation, higher operating temperatures are required in order to reduce the heating time, and increase the number of parts per piece of equipment per unit time which may be produced. If temperature below those in the operating area are utilized, the sheet is not properly formed and usually will fail to conform precisely to the configuration of the mold, whereas if higher temperatures are utilized, there will be a tendency for the sheet to stick to the platen and undesirably deform, scar or mar the sheet surface.

Generally, such thermoformed parts have a configuration which permits them to be nested or stacked one within another in the manner similar to the nesting of conical cups. Usually such thermoformed parts, in order to be satisfactory, must release from each other or have the property of "stack release."

It is an object of this invention to provide a method of thermoforming an alkenyl aromatic resinous sheet over a wide range of conditions.

It is a further object of this invention to modify known alkenyl aromatic resinous sheets in order to improve their thermoformability.

It is still a further object of this invention to provi 'e an improved method of thermoforming alkenyl aromatic sheets wherein the operating range or area is broadened by means of the application of a suitable surface coating.

These benefits and other advantages in accordance with the invention are achieved by applying to the surfaces of an alkenyl aromatic resinous sheet to be thermoformed, a coating comprising an aqueous dispersion of a member selected from the group consisting of sodium oleate and potassium oleate and mixtures thereof which is substantially non-reactive and a non-solvent for said alkenyl aromatic resin under the coating conditions, evaporating said liquid medium from surface of said alkenyl aromatic resin to deposit a substantially continuous uniform coating of the oleate thereon, and subsequently thermoforming said sheet.

The oleate salts utilized in the present invention may be substantially pure. However, from an economic standpoint, technical grades which contain customary contaminants are successfully employed in the practice of the invention.

A suitable dispersing medium for the oleates for applications to the surfaces of alkenyl aromatic resins is water, which is particularly advantageous because of its ready availability and low cost. However, other materials such as alcohols, methyl alcohol, ethyl alcohol, propyl alcohol, butyl alcohol and the like are readily employed. Beneficially, the concentration of the oleate in the dispersing medium is often adjusted within its limits of solubility to conform to the particular method of coating application which is being utilized. The dispersion of oleates is readily applied to the surfaces of alkenyl aromatic resins by spraying, dipping, rolling, brushing and like methods.

Beneficially, there should be deposited upon the alkenyl aromatic resinous sheet from a solution or dispersion a coating of from about 0.35 milligram per square foot of the oleate to about 5 milligrams of the oleate per square foot. Surface coating weights lower than about 0.35 milligram per square foot are difficult to deposit from water due to poor wetting of the surface and above a coating weight of 5 milligrams per square foot there appears to be no advantage gained and the thermoforming properties are not significantly improved. Alkenyl aromatic resinous sheets having excellent thermoforming properties are obtained when the oleate coating is from about 25 to about 500 angstroms in thickness. For most applications a coating thickness from about 50 to 100 angstroms is beneficially employed. Beneficially, the coating weights in the range of from about 0.50 miligram of oleate per square foot to about 3 milligrams of salt per square foot are usually the most desirable. Employing conventional coating apparatus, these coating weights are readily controlled by the thickness of the coating material applied to the alkenyl aromatic sheet in such a manner that the desired quantity is readily obtained and a minimum of the liquid medium is to be evaporated. Oriented alkenyl aromatic resinous sheets in accordance with the invention which have been coated with a liquid dispersion of oleates in a volatile solvent or dispersing agent are readily dried to form a coating by exposure to air, heated air, infrared radiation, and the like conventional drying means.

If desired, a solution or dispersion of the oleate may also be utilized to carry other coating components. Typically, if talc or similar material is to be added uniformly to the sheet, it is admixed and dispersed in the metal salt solution and applied simultaneously. Similarly, other dispersible or soluble materials are readily added in a like manner. Typical of these are pigments, stabilizers, dyes, antistatic agents and the like.

*Example I*

Figure 2:
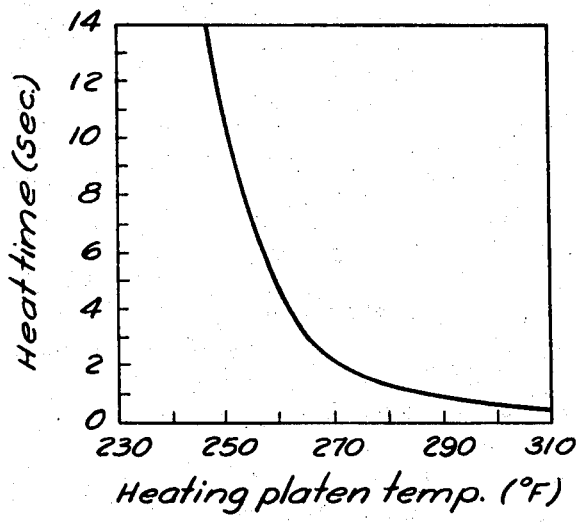

A biaxially oriented polystyrene sheet of about 10 mils in thickness was coated on both sides with a ¼ of 1 percent solution of sodium oleate in water. The coating was metered with a wire wrapped or wound rod which gave a dry coating weight of sodium oleate of about 0.5 milligram per square foot. The wet coated sheet was dried in air at a temperature of about 50° centigrade, subsequently cut to a convenient size for vacuum forming into meat trays. The resultant sheets were heated on the platen of the pressure forming machine at predetermined temperatures for a predetermined period of time. At the end of the heating period, pressure was applied to the sheet and it was drawn into or toward the mold. Under a certain combination of circumstances a smooth surfaced pressure formed article was obtained which reproduced the form of the mold with good fidelity and showed no scars or marks upon the surface. These trays were considered to be acceptable. Some trays were prepared wherein the sheet to be formed tended to stick to the platen, resulting in scarring and disfiguring of the resultant product. The trays produced under these conditions are designated as sticking. Under conditions where the temperature or time were too low, the resultant meat trays did not draw properly, and did not conform to the mold in a satisfactory manner. Frequently, these low temperature time products would perforate when pressure was applied. The perforation was designated as "blow holes." The results of the experiments are illustrated in FIGURE 2 wherein the area to the right of the curved line is designated as the operating area. The area lying to the left is designated as the blow hole area. Arbitrarily selecting a heating time of 8 seconds, it is seen that a platen temperature of 252° Fahrenheit to over 310° Fahrenheit may be utilized for the forming.

The diagram shown in FIGURE 1 represents similar experimental work in forming meat trays. The data represented in FIGURE 1 was obtained employing a procedure substantially identical to that utilized in obtaining the data depicted in FIGURE 2 with the exception that no oleate coating was utilized on the sheet which was thermoformed. The area between the two curved lines is designated as the operating area. The area lying to the right of the high temperature portion is designated as the sticking area, and the area lying between the left hand curved line and the ordinate is designated as the blow hole area. At a heating time of 8 seconds, the platen temperature could vary between about 250° and about 259° and produce an acceptable product. This represents an operating range of about 10°, whereas in accordance with the practice of the invention the operating range is about 52°.

*Example II*

The procedure of Example I is repeated with the exception that 0.25 percent aqueous solution of potassium oleate is utilized instead of sodium oleate. The results of this experiment are substantially those obtained with sodium oleate.

In a manner similar to the foregoing examples, marked improvement in the thermoforming characteristics of alkenyl aromatic resinous sheets are obtained when treated with dispersions of sodium oleate, potassium oleate or mixtures thereof. Sodium oleate and potassium oleate and mixtures thereof are found to be particularly desirable as aqueous dispersions readily spread evenly over the untreated surface of the polymer sheet, and dry to an even, uniform coating of excellent appearance. Materials such as sodium and potassium oleates are particularly suitable for use on alkenyl aromatic resinous film or sheet for the packaging of food stuff. Wetting of the sheets is obtained at lower concentrations than is obtained employing other fatty acid metal salts and stack release properties are significantly improved.

Commensurate results are achieved when other alkenyl aromatic resins as hereinbefore described are utilized in the practice of the invention with hereinbefore delineated salts.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In the thermoforming of oriented alkenyl aromatic resinous sheet wherein said sheet is heated to a thermoplastic temperature, conformed to a mold or form and subsequently cooled to provide a rigid shaped sheet, the improvement which comprises applying to said sheet prior to thermoforming a coating comprising a water dispersion of a salt selected from the group consisting of potassium or sodium oleate and mixtures thereof, evaporating the water from the surface of the alkenyl aromatic resinous sheet to deposit thereon a substantially continous coating of the salt, and subsequently thermoforming said sheet.

2. The method of claim 1, wherein said salt is sodium oleate.

3. The method of claim 1, wherein said salt is deposited on the surface of said alkenyl aromatic resinous sheet at a coating weight of about from 0.35 milligram per square foot to about 5 milligrams per square foot.

4. The method of claim 1, wherein said salt coating has a coating weight of about 0.50 milligram per square foot to about 3 milligrams per square foot.

5. The method of claim 1, wherein said alkenyl aromatic resinous sheet is biaxially oriented polystyrene.

6. In the thermoforming of biaxially oriented polystyrene sheet, wherein the sheet is heated to a thermoplastic temperature, conformed to a mold or form and subsequently cooled to provide a rigid shaped sheet, the improvement which comprises applying to the sheet prior to thermoforming a coating comprising an aqueous dispersion of sodium oleate, drying the coating to deposit on the surface of the polystyrene sheet a salt coating having a coating weight of from about 0.35 milligram per square foot to about 5 milligrams per square foot and subsequently thermoforming the sheet.

References Cited

UNITED STATES PATENTS

| | | | |
|---|---|---|---|
| 1,558,440 | 10/1925 | Weber | 106—38.24 |
| 2,128,534 | 8/1938 | Howald | 242—130 |
| 2,296,723 | 9/1942 | McClurg et al. | 264—292 |
| 2,356,814 | 8/1944 | Bimmerman et al. | 264—130 |
| 2,965,589 | 12/1960 | Price | 106—38.24 |
| 3,015,132 | 1/1962 | Bonting | 264—130 |
| 2,095,129 | 10/1937 | Drew. | |
| 2,235,516 | 3/1941 | Cornwell. | |

FOREIGN PATENTS 531,497   1/1941   Great Britain.

ROBERT F. WHITE, *Primary Examiner.*

A. R. NOE, *Assistant Examiner.*